United States Patent [19]

Dalo et al.

[11] Patent Number: 4,948,177
[45] Date of Patent: Aug. 14, 1990

[54] LAMINATED FITTING FOR HEAT EXCHANGER

[75] Inventors: Dominic N. Dalo, Buffalo; Peter G. Wolf, Tonawanda, both of N.Y.

[73] Assignee: General Motors Corporation, Detroit, Mich.

[21] Appl. No.: 332,201

[22] Filed: Apr. 3, 1989

Related U.S. Application Data

[62] Division of Ser. No. 213,748, Jun. 30, 1988.

[51] Int. Cl.$^5$ ............................................. F16L 47/02
[52] U.S. Cl. .................................... 285/132; 285/137.1; 285/176; 285/286; 285/416; 285/363; 285/383; 165/173; 165/175
[58] Field of Search .................... 285/176, 416, 137.1, 285/132, 405, 413, 286, 363, 383; 165/173, 175

[56] References Cited

U.S. PATENT DOCUMENTS

| | | | |
|---|---|---|---|
| 3,326,279 | 6/1967 | Eisberg | 285/137.1 X |
| 3,426,841 | 2/1969 | Johnson | 285/137.1 X |
| 3,948,315 | 4/1976 | Powell | 285/137.1 X |
| 4,208,529 | 6/1980 | Murray | 285/137.1 X |
| 4,311,193 | 1/1982 | Verhaeghe | 165/153 X |
| 4,529,034 | 7/1985 | Saperstein | 165/175 X |
| 4,583,583 | 4/1986 | Wittel | 165/168 X |
| 4,645,001 | 2/1987 | Hillerstrom | 165/159 |
| 4,730,669 | 3/1988 | Beasley | 165/173 X |

FOREIGN PATENT DOCUMENTS 0005150  2/1912  United Kingdom ............ 285/137.1

*Primary Examiner*—Dave W. Arola
*Attorney, Agent, or Firm*—R. L. Phillips

[57] ABSTRACT

An end fitting for a serpentine heat exchanger couples an inlet or outlet port to a pair of flat tubes comprising the heat exchange core. The fitting comprises three laminated plates and a nipple coupled to an opening in the outermost of the plates. The inner plate is a header plate with slots for receiving the flat tubing. A spacer plate interconnects the outer and inner plates and has an aperture shaped to couple the port to the slots for defining a fluid flow path. The plates are stamped from aluminum sheet stock clad with a brazing alloy. The plates are assembled and secured by a steel rivet and the nipple is attached. The parts are joined by brazing. The fitting can be brazed to the exchanger core at the same time.

4 Claims, 1 Drawing Sheet

4,948,177

LAMINATED FITTING FOR HEAT EXCHANGER

FIELD OF THE INVENTION

This invention relates to a fitting and the method of making a fitting for a heat exchanger and particularly to a laminated fitting.

BACKGROUND OF THE INVENTION

It is common practice to construct heat exchangers with one or more tubes to conduct a working fluid through a long and sometimes tortuous path to obtain heat transfer between the working fluid and the ambient fluid surrounding the tubes. It has been recognized that paths comprising two tubes in parallel impose a smaller pressure drop between the inlet and outlet of the heat exchanger with resulting improvement in system efficiency.

The chief tube designs which have evolved for heat exchanger use are a round tube and a flat or oval tube. The tubes are connected to input and output ports which generally take the form of a round stub pipe or nipple, the connections being perfected by special fittings adapted to the particular heat exchanger design. It is always important that the fittings enhance system integrity. For that reason the fittings must have a high burst pressure when used with high pressure systems.

When a heat exchanger employs round tubes, two parallel paths are accommodated by a fitting formed of a round tube bent in a U-shape to engage the ends of both tubular paths and a tubular tee branch forming the port at the bend of the U. This fitting has been quite successful. On the other hand, when flat or oval tubes are used for parallel paths a design using a U-shaped flat tube for joining the path ends has the weakness that the internal pressure tends to deform the flat tube into a round shape. The consequential strain at the joints results in a low burst pressure of the fitting. It is thus desired to provide a fitting for plural flat tubes having a high burst pressure.

SUMMARY OF THE INVENTION

It is therefore an object of the invention to provide a fitting for flat tubes which has a high burst pressure. It is another object to provide such a fitting which is readily coupled to a heat exchanger. It is also an object of the invention to provide a method of making such a fitting.

The invention is carried out by a fitting for coupling to a flat tube serpentine heat exchanger comprising; tube coupling means comprising a first plate having perforation means shaped to conform to and receive flat tubing, spacer means comprising a second plate having an opening communicating with the perforation means and a margin surrounding the opening, the spacer means being bonded at its margin to the first plate, a third plate bonded to the margin of the second plate and having a port in communication with the opening in the spacer means, and tubular conduit means secured to the port in the third plate, whereby a fluid flow passage is provided between the conduit means and the perforation means.

The invention is further carried out by the method of making a fitting for a heat exchanger having flat tubing comprising the step of; stamping from sheet stock first, second and third flat plates, forming at least one slot shaped aperture in the first plate to conform to flat heat exchanger tubing, forming an opening in the second plate, forming a port opening in the third plate, stacking the first, second and third plates with the second plate between the first and third plates and the second plate opening communicating with the port opening and the aperture, and bonding the plates at portions outboard of the respective openings and apertures.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE PREFERRED EMBODIMENT

Figure 1:
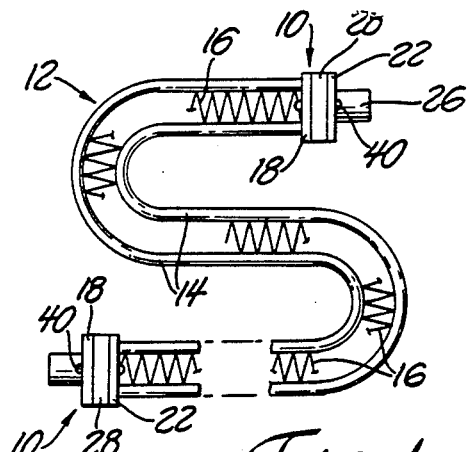
FIG. 1 is an elevational view of a serpentine heat exchanger with fittings according to the invention.

FIG. 1 illustrates an application of the fittings of the invention. A fitting 10 is attached to each end of a serpentine heat exchanger 12 to provide inlet and outlet ports. The heat exchanger 12 comprises a spaced pair of flat aluminum tubes 14 connected in parallel and shaped in a serpentine pattern having many loops, although two loops are shown. An aluminum air center 16 bridges the space between the tubes and facilitates heat transfer to the surrounding air. The heat exchanger 12 may have more than two tubes 14 or only one, however two tubes is the preferred design and the fitting of the invention will be described in that context. It will be apparent, however, that the invention is not limited to a fitting for two tubes. In the same way, the preferred heat exchanger material is aluminum and the fitting is preferably composed chiefly of aluminum parts but the invention is not limited to that material. The function of the fittings 10 is to couple the flat heat exchanger tubes to round external fluid conduits and requires leak free connections, high burst pressure and efficient flow distribution to and from the tubes.

Figure 2:
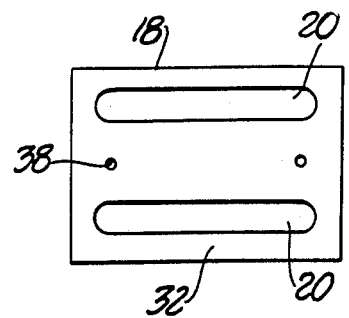
FIG. 2 is a component of a fitting of FIG. 1 comprising a first plate for coupling to heat exchanger tubing.
Figure 3:
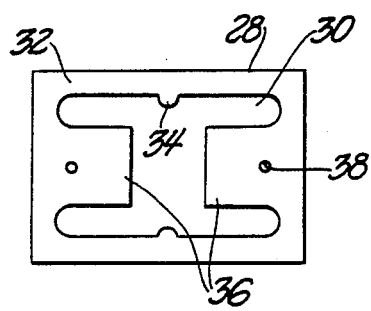
FIG. 3, is a component of a fitting of FIG. 1 comprising a second plate.
Figure 4:
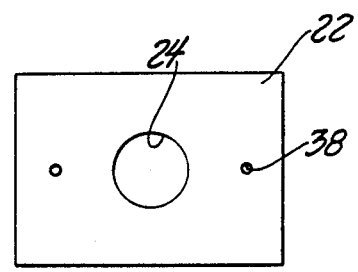
FIG. 4 is a component of a fitting of FIG. 1 comprising a third plate for coupling to an inlet or outlet nipple.
Figure 5:
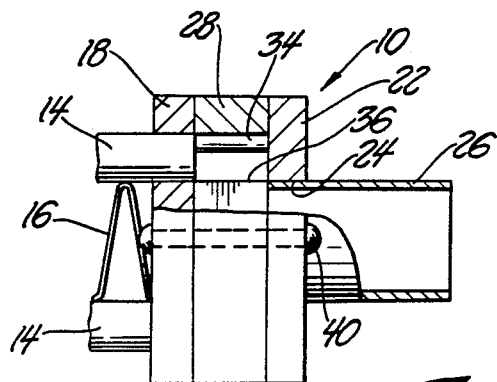
FIG. 5 is a partially sectioned view of the fitting of FIG. 1.

FIGS. 2, 3 and 4 show components and FIG. 5 shows an assembly of the fitting 10 which meets these needs. A generally rectangular plate 18 has a pair of elongated holes or slots 20 spaced to align with the flat tubes 14 of the heat exchanger. The slots 20 are sized to conform to the periphery of the tubes 14 so that the tubes may be inserted into the slots 20 and bonded to the plate 18. A plate 22 of the same outer size and shape as the plate 18 has a central round port opening 24 for receiving a nipple 26 which is the port of the fitting for either inlet or outlet purposes and extends from one side of the plate 22. A spacer plate 28, also of the same outer size and shape as the plate 18 has a generally H-shaped opening 30 covering an area surrounding the opening 24 and extending substantially over the slots 20 in the plate 18. The margin 32 of the plate 28 outboard of the opening 30 is in contact with the adjoining surfaces of the plates 18 and 22. Each side of the H-shaped opening 30 has a small nib 34 projecting toward the center of the opening by an amount sufficient to overlap the slots 20. These nibs 34 serve as stops to prevent intrusion of the heat exchanger tubes 14 into the opening 30 when the fitting is applied to a heat exchanger. The margin 32 has fingers 36 extending inwardly between the slots 20 to overlap the opening 22 a small amount to form a stop for the nipple 26 when it is inserted into the opening 24 of the plate 22. The fingers 36 also increases the area of the plate 28 in contact with both plates 18 and 22. As a matter of design this is desirable since it reduces the unit loading on the plates 18 and 20. The plates 18, 22 and 28 have two aligned holes 38 on opposite sides of the port opening 24. Rivets 40 extend through the holes to mechanically secure the parts upon assembly until the plates are bonded together. The rivets may be steel or other material having a lower coefficient of expansion than aluminum. The adjoining interfaces of the plates are bonded at the margin 32 by brazing and the nipple 26 is joined to the opening 24 in the same way. The material used for the plates is aluminum 3003 sheet stock 0.125 inch thick, and clad with a coating of aluminum 4343 on at least the plates 18 and 22.

It will thus be seen that the fitting meets the requirement of high burst pressure since the slotted plate 18 has ample strength to resist the lateral forces on the flat tubing 14 when under pressure from the working fluid of the heat exchanger. In addition, the flow distribution between the port and the tubing 14 is optimized by the design of the plate 28 which acts as a spacer between the plates 18 and 22. The thickness of the spacer can be chosen as a matter of design with the expense and weight offsetting any advantages of a thicker spacer. The specific shape of the stamped opening 30 is also a matter of choice, not dictated by fabrication economics.

In the manufacture of the fitting 10 the plates 18, 22 and 28 are stamped from plate aluminum stock and the slots 20 and openings 24 and 30 are stamped out. Preferably the stock for at least the plates 18 and 22 is clad with aluminum brazing alloy so that the adjoining plate surfaces can be brazed without additional brazing material. The plates are degreased, coated with flux and then stacked in the proper order and held together by the rivets 40; the nipple 26 is assembled to the opening 24. The fingers 36 prevent the nipple from being inserted too far into the stack. Preferably the assembly is then coupled to the ends of tubes 14. The nibs 34 extending from the margin 32 over the slots 22 prevent the tubes 14 from entering too far into the fitting. The assembly is brazed using a method that is well known for brazing aluminum heat exchangers. The heat exchangers can be processed in large batches by heating to just the right temperature so that the brazing alloy melts and flows to secure the junction points of the parts. Due to differential expansion of the rivets and the aluminum when heated to brazing temperature, the rivets 40 provide contact force between the aluminum plates to enhance the bonding process. In the case of the nipple 26 and the tubes 14, the brazing alloy on the surface of the plates runs into the interfaces to form leak free bonds.

It will thus be seen that fittings resistant to deformation by high pressure can be fabricated by economical methods.

The embodiments of the invention in which an exclusive property or privilege is claimed are defined as follows:

1. A fitting for coupling to a flat tube serpentine heat exchanger comprising; a flat tube, tube coupling means comprising a first flat plate of uniform thickness having perforation means shaped to conform to and receive said flat tube, spacer means comprising a second flat plate of uniform thickness having an opening communicating with the perforation means and a margin surrounding the opening, the spacer means being bonded at its margin to the first plate, a third flat plate of uniform thickness beyond the margin of the second plate and having a port in communication with the opening in the spacer means, and tubular conduit means secured to the port in the third plate, whereby a fluid flow passage is provided between the conduit means and the perforation means, and the margin of the spacer means having inwarding extending stop means partially covering both the perforation means and the port to prevent both the flat tube and the conduit means from extending into the tube coupling means past the respective first plate and third plate to facilitate their proper assembly.

2. A fitting for coupling to a flat tube serpentine heat exchanger comprising; at least two flat tubes, tube coupling means comprising a first flat plate of uniform thickness having s lot shaped perforations shaped to conform to and receive the flat tubes, spacer means comprising a second flat plate of uniform thickness having an opening communicating with the perforations, the opening being defined by a margin surrounding the opening and the perforations, the spacer means being bonded at its margin to the first plate, a third flat plate of uniform thickness bonded to the margin of the second plate and having a port in communication with the opening in the spacer means, a nipple secured to the port in the third plate, whereby a fluid flow passage is provided between the nipple and the perforations, and the margin of the spacer means having inwarding extending stop means partially covering both the perforations and the port to prevent both the flat tubes and the nipple from extending into the tube coupling means past the respective first plate and third plate to facilitate their proper assembly.

3. The invention as defined in claim 1 wherein the stop means is a nib for the flat tube and a finger for the tubular conduit means.

4. The invention as defined in claim 1 wherein rivets having a lower coefficient of expansion than the plates secure the plates together to facilitate their bonding.

* * * * *